United States Patent
Farmer et al.

(10) Patent No.: US 12,432,181 B2
(45) Date of Patent: Sep. 30, 2025

(54) SYSTEMS AND METHODS FOR IMPLEMENTING TRANSPARENT SaaS PROXY ON AND OFF NETWORK

(71) Applicant: Capital One Services, LLC, McLean, VA (US)

(72) Inventors: Douglas E. Farmer, McLean, VA (US); Glen A. Wilson, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 526 days.

(21) Appl. No.: 17/527,718

(22) Filed: Nov. 16, 2021

(65) Prior Publication Data
US 2023/0155983 A1    May 18, 2023

(51) Int. Cl.
*H04L 9/40*        (2022.01)
*H04L 41/0604*     (2022.01)
*H04L 67/561*      (2022.01)
*H04L 67/563*      (2022.01)

(52) U.S. Cl.
CPC ...... *H04L 63/0281* (2013.01); *H04L 41/0627* (2013.01); *H04L 63/0272* (2013.01); *H04L 67/561* (2022.05); *H04L 67/563* (2022.05)

(58) Field of Classification Search
CPC . H04L 67/563; H04L 67/561; H04L 41/0627; H04L 63/0272; H04L 63/0281
See application file for complete search history.

(56) References Cited

U.S. PATENT DOCUMENTS

| | | | |
|---|---|---|---|
| 10,003,576 B2 | 6/2018 | Hopen et al. | |
| 10,951,589 B2 | 3/2021 | Neystadt et al. | |
| 10,972,434 B2 | 4/2021 | Kupisiewicz et al. | |
| 11,502,994 B2* | 11/2022 | Vemulpali | H04L 61/5007 |
| 2013/0005296 A1* | 1/2013 | Papakostas | H04W 24/00 |
| | | | 455/405 |

(Continued)

FOREIGN PATENT DOCUMENTS

KR    20200095352 A    8/2020

OTHER PUBLICATIONS

International Search Report and the Written Opinion of the International Searching Authority issued in related PCT Application No. PCT/US2022/049987 mailed Mar. 3, 2023, 15 pages.

(Continued)

*Primary Examiner* — Kamal B Divecha
*Assistant Examiner* — Eui H Kim
(74) *Attorney, Agent, or Firm* — HUNTON ANDREWS KURTH LLP (57) ABSTRACT

The present disclosure is directed to a system/method for utilizing SaaS proxy platform to provide a transparent proxy solution and allow deployment of a hybrid network having a uniform proxy/Internet access environment for both on-network and off-network user traffic. A granular architecture for steering of user Internet traffic is presented that utilizes a SaaS agent as a primary proxy control based on modifications to the PAC files to allow for surgical traffic control. The proposed approach utilizes SaaS proxy agent beyond its intended capabilities and provides a solution that improves uniformity of user Internet experience as well as improving security and network resiliency in a hybrid network.

8 Claims, 5 Drawing Sheets

(56) References Cited

U.S. PATENT DOCUMENTS

| | | | |
|---|---|---|---|
| 2015/0135302 A1* | 5/2015 | Cohen | G06F 21/128 |
| | | | 726/12 |
| 2019/0020723 A1* | 1/2019 | Kumar | H04L 63/029 |
| 2019/0387451 A1* | 12/2019 | Kucera | H04L 65/1023 |
| 2020/0329060 A1* | 10/2020 | Bergström | G06F 21/53 |
| 2020/0374229 A1 | 11/2020 | Vysotsky et al. | |
| 2021/0119871 A1* | 4/2021 | Page | H04L 67/51 |
| 2021/0160214 A1* | 5/2021 | Jain | G06F 21/6218 |
| 2023/0261974 A1* | 8/2023 | Ramaswamy | H04L 43/16 |
| | | | 370/389 |

OTHER PUBLICATIONS

Notification concerning Transmittal of International Preliminary Report on Patentability issued in related PCT/US2022/049987, mailed May 30, 2024, 10 pages.

* cited by examiner

SYSTEMS AND METHODS FOR IMPLEMENTING TRANSPARENT SaaS PROXY ON AND OFF NETWORK

FIELD OF THE DISCLOSURE

The present disclosure relates generally to proxy-based internet traffic steering, and more specifically, to a versatile SaaS proxy solution in a hybrid network.

BACKGROUND INFORMATION

Prior to the advent of the networked computers, employees would travel to their office every day to perform their work functions. When personal computers came along, tasks became easier for employees to perform. However, based on the limitations of the personal computer, and the limitations of networking technology, workers were still required to travel to their office to perform their work functions. Although various mobile device technologies (e.g., Blackberry and Palm devices) enabled workers to perform some functions remotely, mostly limited to communications (e.g., email, messaging, etc.), the remote work-related capabilities of employees were still limited.

As personal computers advanced and proliferated into most people's homes (e.g., including affordable laptops), and with the advancements in networking technologies and networking speeds, many work functions, that previously required the employee to be present in their office, could now be performed at home. In fact, with the advent of remote software capabilities, which can facilitate an employee to perform most, if not all, of their tasks remotely, more and more work functions are being performed out of the office. However, reliance upon a remote connection to externally access and utilize work-related digital resources may present a significant security risk, given that external connections to an enterprise network may be more vulnerable to security breaches than a controlled and monitored connection through a single secure network at the office.

With the advent of cloud based networking/computing, many computing-related services, may now be implemented transparently by a third-party service provider. This functionality may be offered as a service to clients, such as user of an enterprise network. Among such services are implementation of internet traffic security and network security tools such as proxies. These types of cloud-based security-related services may be particularly useful for enterprise networks comprising multiple remote sites and off-network users (i.e., connecting to the enterprise network via a third party Internet service provider (ISP)) as it obviates a need to maintain a presence on the secure enterprise network in order to benefit from such network security services. However, in order to operate seamlessly and uniformly in a hybrid network, featuring both on and off network generated traffic, such cloud-based services must closely match the performance and the user experience associated with similar services offered on the network. Thus, it may be beneficial to provide a hybrid implementation for uniform management of internet traffic security in an enterprise network comprising both on-network and off-network user traffic.

SUMMARY OF EXEMPLARY EMBODIMENTS

Embodiments of the present disclosure provide a method that utilizes a software as a service (SaaS) proxy platform in a specific way to transparently facilitate a hybrid network traffic control. The method for implementing the transparent proxy-based hybrid network traffic control comprises modifying a configuration of an SaaS proxy agent by removing one or more network location references for incoming traffic from the configuration, to thereby provide a modified SaaS proxy agent configuration having no on-network traffic restriction. For the purpose of the present disclosure, an SaaS proxy agent with a modified configuration as described, is interchangeably referred to as a modified SaaS proxy agent. The no traffic restriction attribute of the modified SaaS proxy agent, amounts to an improvement in the way SaaS proxies are conventionally used. The method may further comprise installing the modified SaaS proxy agent on one or more network devices associated with the hybrid network, the one or more network device comprising one or more on-network endpoint devices and one or more off-network endpoint devices. The one or more network devices may further comprise one or more gateway device in case a redundant commonly accessible proxy connection is needed.

Therefore, in accordance to some embodiments, the method involves the creation of a modified SaaS proxy agent that actively facilitates the forwarding of incoming Internet traffic to intended destinations via the cloud SaaS proxy service, without restrictions based on a network source location of the incoming traffic (i.e., whether or not a direct (local/remote) connection to the on-premise proxy device is available). The method may further involve creating one or more proxy auto-configuration PAC files designed/configured to direct user internet traffic, associated with the one or more network devices, to the modified SaaS proxy to be forwarded via a SaaS proxy connection to a cloud SaaS proxy service, and onward to its intended destinations.

This transparent proxy based approach for controlling Internet traffic in a hybrid network is applicable to local devices (i.e., with a direct connection to the on-premise proxy), remotely connected on-network devices (i.e., with a Software-Defined Wide Area Network (SDWAN) connection to the on-premise proxy), as well as the off-network devices (i.e., devices with a remote connection, generally through a third party ISP network, to internal resources of the hybrid network such as a on-premise proxy device.) The creation of a primary SaaS proxy mechanism for forwarding of all authorized Internet traffic through a SaaS proxy service may be further supplemented by creating one or more PAC files to direct network traffic (regardless of the their on/off network origination point) to the modified SaaS proxy agents installed on the network endpoint devices. The one or more PAC files may be further configured for: steering a portion of the user Internet traffic towards one or more internal destinations associated with the hybrid network, and/or steering the user Internet traffic to a failover path when the cloud SaaS proxy service is not available, the failover path corresponding, for example, to an on-premise proxy device associated with the hybrid network.

In some exemplary embodiments, the modified SaaS proxy agent may be installed on a hub gateway, which may be communicatively coupled to an on-premise proxy device. In accordance to some embodiments, the hub gateway device may have a direct connection to some local endpoint devices, a remote SDWAN based connection to some remotely connected endpoint devices and a Virtual private Network (VPN) connection to one or more off-network endpoint devices. In this exemplary arrangement a VPN split traffic configuration may be used to facilitate the always-on SaaS proxy connection for secure forwarding of Internet traffic for the one or more off-network endpoint devices.

Consequently, based on installation of the modified SaaS proxy agent at the hub, a SaaS proxy connection may be established at the hub that may be used as a load balancing or a redundant failover SaaS proxy connection for the on-network and off-network devices. In accordance to some embodiments, this my further involve configuring one or more PAC files to designate the hub SaaS proxy connection as a failover SaaS proxy connection for the one or more remote and off-network endpoint devices. The hub SaaS proxy connection may be accessible to the remote and off-network endpoint device via the SDWAN and the VPN connections respectively.

In some exemplary embodiments of the present disclosure, the SaaS proxy platform may further comprise a management application programming interface that is accessible via the SaaS proxy service, and that adds the SaaS proxy service to a primary proxy pool. In some embodiments the one or more security policies associated with the cloud SaaS proxy service and the on-premise proxy device may be converted to a centralized management platform using a universal policy enforcement service. In some embodiment, the SaaS proxy service may forward web traffic requests via Internet Protocol Security (IPsec) tunnels.

The SaaS proxy platform may comprise a malware sandboxing server that facilitates malware scanning for web traffic requests based on identified categories of Internet traffic that are associated with known risk levels, and enables web isolation for specific traffic categories. In some embodiments, custom steering for different categories and/or specified destinations of web traffic requests may be carried out in accordance to one or more corresponding Proxy Auto-Configuration (PAC) files. The SaaS proxy platform may further comprise a cloud data loss prevention (DLP) service that is configured via the SaaS proxy agent.

Data Loss Prevention (DLP) which refers to set of technologies, products and techniques, that are designed to prevent sensitive data from leaving an organization network. In general, DLP is a strategy for ensuring that end-users do not send critical or sensitive information outside the corporate/enterprise network. It described software products that help a network administrator control what data end users can transfer. DLP scanning includes solutions that monitor for, detect, and block the unauthorized flow of information. This may involve scanning Internet traffic based on a set of rules that describe the pattern and/or plain text to search for in Internet traffic.

In some embodiments the method for transparently implementation of proxy-based traffic control in a hybrid network, may utilize one or more authentication connector servers communicatively coupled to the modified SaaS proxy agent to enable transparent authentication of user Internet traffic.

Some aspects of the present disclosure are further directed to a hybrid network with a transparent proxy-based security enforcement mechanism, the hybrid network may further comprise: one or more on-network endpoint devices connected to the hybrid network via one of a direct connection at a hub and a Software-Defined Wide Area Network (SD-WAN) connection at a campus site. The hybrid network may further comprise one or more off-network endpoint devices connected to the hybrid network via a Virtual private Network (VPN) connection. The transparent proxy-based security enforcement mechanism associated with the hybrid network, as described in accordance to some embodiments, may then be facilitated through installation of a modified SaaS proxy agents with no on-network traffic restrictions, on the one or more on-network and off-network endpoint devices. The modified SaaS proxy agent being configured to forward Internet traffic, associated with the one or more on-network and off-network endpoint devices, to a cloud SaaS proxy service across a SaaS proxy connection.

In accordance to some embodiments, the one or more proxy auto-configuration (PAC) files, may be further configured to: steer network traffic associated with user Internet traffic to the one or more modified SaaS proxy agents to be forwarded using the cloud SaaS proxy service, steer network traffic associated with a first restriction to an on premise proxy device to be forwarded to one or more internal and external destinations, and steer network traffic associated with Internet traffic to a failover path when the cloud SaaS proxy service is not available, the failover path corresponding to the on-premise proxy device at the hub.

In some embodiments, the no traffic restriction (i.e., active for both on-network and off-network traffics) attribute of the modified SaaS proxy agent may correspond to removal, from a configuration file associated with a SaaS proxy agent, of one or more network location references for the incoming traffic.

Some embodiments provide for a split virtual private network (VPN) traffic configuration for off-network connected devices. In some embodiments, the SaaS proxy application is configured to be a primary content filtering and web access security enforcement portal for an enterprise network, while being capable of steering traffic to an on premise proxy if a connection to a SaaS proxy service cannot be established.

In some embodiments, a hub associated with the hybrid network may further comprise an on-premise proxy device communicatively coupled to a hub gateway device, wherein, a modified SaaS proxy agent installed on the hub gateway device may provide a hub SaaS proxy connection for forwarding user Internet traffic through the cloud SaaS proxy service. In order to implement the steering of user traffic over to the hub SaaS proxy connection (i.e., for load balancing and/or as a failover option when one or more SaaS proxy connection associated with on-network/off-network endpoint device fails) one or more PAC files may need to be configured to designate the hub SaaS proxy connection as a failover SaaS proxy connection accessible via the VPN and the SDWAN connections.

According to some embodiments, security enforcement specifications associated with the SaaS proxy service and the on-premise proxy may be converted to a uniform format with, for example, a centralized management platform such as the Universal Policy Enforcement (UPE) service. This will ensure a same level of security, uniformly applied to both on-premise proxy and SaaS proxy facilitated network/Internet traffic.

Some embodiments of the present disclosure are further directed to a SaaS proxy method for facilitating hybrid network traffic control which comprises the steps of: storing a proxy auto-configuration (PAC) file that defines a plurality of exceptions for controlling web content request and corresponding network paths for web traffic steering, monitoring off network and on premise web requests, evaluating the PAC file to determine whether to grant access to steer off-network and on-premise traffic to a SaaS proxy service.

In accordance to some embodiments of the present disclosure, the method may further comprise: modifying a configuration file of a SaaS proxy agent to prevent the SaaS proxy service from de-activating upon receiving on-premise and/or virtual private network (VPN) network traffic, thereby steering both on-network and off-network web traffic, associated with one or more enterprise users, to the SaaS proxy service. The method may further comprise implementing PAC file modifications to enable granular re-direction of user web traffic from the SaaS proxy to the on-premise proxy for one or more designated categories of web traffic. In some embodiments a failover mechanism may be implemented, through modification of the relevant PAC file, to switch traffic steering to the on-premise proxy if a cloud SaaS proxy service becomes inaccessible. In accordance to some embodiments a PAC file may further be configured to steer user Internet traffic associated with endpoint devices without a SaaS proxy agent, towards the on-premise proxy device.

In some embodiments, the hybrid network may further comprise a malware sandboxing server that facilitates malware scanning for user Internet traffic requests based on identified categories of Internet traffic associated with one or more risk levels. The hybrid network may also utilize one or more authentication connector servers, communicatively coupled to the modified SaaS proxy agent, to provide transparent authentication for the user Internet traffic.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

DETAILED DESCRIPTION OF EXEMPLARY
EMBODIMENTS

The exemplary system, method and computer-accessible medium, according to an embodiment of the present disclosure, is directed to an approach to utilize a SaaS proxy platform, such as, Web Security Service (WSS), to provide a transparent proxy solution designed to enable a hybrid network deployment with customizable steering of both on-network and off-network traffic.

Network traffic security and performance improvement in terms of speed and bandwidth may be addressed through optimal steering of web traffic at a gateway point such as a proxy. Such proxy devices may be deployed as a network portal for user/application generated internet traffic (i.e., https or FTP request accessible via private and/or public network) to improve user traffic security/privacy and network bandwidth/speed performance.

A Proxy or Proxy Server is an intermediary server, either software or hardware, the sits between an end user and a website or other service's server. Proxies are commonly used for information security against threats and for system optimization, such as load balancing and caching of similar requests for added speed. A proxy represents a gateway between a local network (for example, all the computers at one company or in one building) and a larger-scale network such as the internet and translates traffic between networks or protocols. Proxy service comprises a proxy agent, generally installed on a user device, and a proxy server with which the agent communicates. User/application generated traffic is received by the agent and sent to the proxy server. The traffic then flows through the proxy server on its way to the requested destination (i.e., as identified by an IP address, domain/host name, etc.). The requested content then comes back through that same proxy server (there are exceptions to this rule), and then the proxy server forwards the data received from the website back to the originating user/application.

Consequently, a proxy server can improve security and privacy by blocking access to certain web pages, based on identifiers such as an IP address and domain/host name, as well as monitor and log all web requests. Other security related service provided by a proxy may include, changing of the IP address and other identifying information included in the web traffic to hide an identity of a sender from a destination or an intermediary server, as well as encryption of web requests and content to safeguard web traffic while in transit. In addition to security, a proxy provides certain performance benefits such as improving network speed and bandwidth utilization. A proxy may achieve this by, for example, consolidating multiple request to a same online resource (i.e., a website) into a single request that is sent to the appropriate server and, caching (save locally) popular websites and transmitting a saved recent copy of a website when multiple request are generated for the same website.

The advent of cloud-based network services and application deployment platforms has obviated the need to implement on premise security-related functionality (i.e., on premise proxy servers) at every point of presence. Furthermore, in an enterprise network, user internet traffic may sometime originate from an off-network location using third party provided network access connections. Such traffic can be transmitted securely in absence of a secure connection to the enterprise network (i.e., On-premise proxy device). The secure handling of Internet/web traffic, in absence of on-premise security-related functionalities, may be achieved by using cloud-based security solutions such as Software as a Service (SaaS) based proxy services. One example of such a service may include Web Security Service (WSS). The implementation of a Proxy service, on the user side, requires installation of a corresponding proxy agent (i.e., SaaS proxy agent) running on the user device to implement the security service.

Enterprise networks often comprises an on-network and off-network infrastructures portions. Secure management and transport of user-generated internet traffic on the on-network portion is conventionally handled by an on-premise proxy device. With respect to the off-network infrastructure, user-generated internet traffic may be processed through a cloud-based proxy agent such as a Software as a Service (SaaS) proxy agent. In cases wherein a user is connecting through the off-network infrastructure, web traffic is transparently steered to the SaaS proxy agent, installed on the off-network device, and forwarded to a cloud-based (off-network) SaaS proxy server. However, traffic routed through on-premise proxy device and cloud-based proxy services (such as a SaaS proxy) may be subject to different security enforcement policies. It would be desirable to implement a transparent proxy solution that give the same internet access experience (i.e., http, https and FTP access) no matter where an enterprise network user may be connecting from.

According to some embodiments, a solution for facilitating a transparent and uniform security enforcement for internet traffic generated by enterprise users whether on or off network is to enable all internet traffic to be handled by the SaaS proxy agents through the cloud-based SaaS proxy service. A challenge presented here is that SaaS proxy agents, such as WSS agent, are deigned to only be used off-network. This is because such proxy services are associated with agent configuration, usually implemented by the proxy vendor, which prioritizes an on-premise proxy connection, whenever one is available, and de-activates the SaaS proxy agent (i.e., "passive mode" operation) at all times while access to an on-premise proxy is available (i.e., when user/application traffic is generated on-network.

As a result, with the existing enterprise proxy implementation, on-network generated internet traffic is always steered through the on-premise proxy device, while off-network traffic is handled through a cloud-based SaaS proxy (i.e., initiated by the SaaS proxy agent installed on the user device) As discussed above, this arrangement results in a non-uniform security policies (i.e., on-premise proxy policy specification and format versus SaaS proxy policy specification and format) to be applied to user/application generated traffic (depending on the corresponding geographic origination point or network access location of the said traffic.)

Furthermore, the existing implementation (corresponding to exclusive activation of either the SaaS proxy agent or on-premise proxy functionalities based on the traffic origination point) fails to exploit the inherent redundancy and failover mechanism associated with having two distinct mechanisms/paths for enabling secure Internet/web connections. Consequently, existing implementations are unable to exploit the inherent redundancy and failover functionality that may be associated with this arrangement. Therefore, one problem to overcome is the automatic de-activation of SaaS proxy agent, (such as a WSS proxy agent), which occurs when an on-premise proxy connection is available and results in directing all the traffic to an on-premise proxy device.

In accordance to some embodiments, a SaaS proxy agent, is configured to always remain active regardless of a user's network location. This requires unconventional modifications to the SaaS proxy agent. According to some embodiments, this is achieved by removing any reference to a network path or location specified in association with the incoming traffic, in the configuration of the SaaS proxy agent. Such that the SaaS proxy agent will direct the on-network generated traffic to the cloud-based SaaS proxy service/server, in the same way as it does for the off-network generated traffic. This may be further supplemented by modification to PAC files for setting the appropriate traffic steering in place.

In some embodiments, implementing an always-ON SaaS agent involves removal of any known network locations for the incoming traffic from the proxy agent configuration file. In this way the SaaS proxy agent is kept active at all times, thus appropriate modifications to PAC files can be made which will effectively force all the user/application generated traffic through the SaaS proxy connection. Therefore, all internet traffic, regardless of network origination point, will be steered through the SaaS proxy agent, thus facilitating a uniform internet traffic control and access security enforcement (by conversion to a universal format) across all user/application generated Internet traffic. Additionally, this will free up the on-premise proxy connection that can now serve as a backup redundant path in case the SaaS proxy connection fails. Accordingly, some embodiments of the present disclosure are directed to a hybrid network with a primary cloud-based proxy control mechanism supplemented with automatic fallback to an on-premise proxy connection. The structure and operations of this hybrid network will be further described below.

Steering all on-network traffic to go through a SaaS proxy agent may present a challenge with respect to sensitive network traffic or network traffic that are required to remain on the private enterprise network. Such network traffic therefore should be steered through the on-premise proxy device(s), or forwarded directly to an internal destination, whenever possible. Therefore, the challenge is to identify portions of internet traffic, generated from endpoint devices associated with the enterprise, that is required to stay on the private enterprise network and to steer these traffic types to the on-premise proxy device(s) while steering traffic not associated with this restriction through SaaS proxy agent whether sourced on-network (locally from a Legacy site and/or remotely from a Campus site) or off-network (i.e., how to get all the traffic to be steered through the SaaS proxy connection, but still bypass certain pieces.)

In accordance to some embodiments, this challenge is overcome by modification of PAC files for granular steering of internet/web traffic, such that portion of web traffic, corresponding to private network restricted traffic, is always re-directed to the on-premise proxies. One aspect of the proposed solution is therefore directed to granular modification to proxy setting (i.e., modification of the associated PAC files) to implement surgical traffic control between the cloud-based SaaS and the on-premise proxy connections.

A PAC file may include a set of exceptions scripted, for example, using JavaScript functions, that determines whether web browser requests (HTTP, HTTPS, and FTP) go directly to a destination or are forwarded to web proxy server and/or how web browsers and other user agents can automatically choose the appropriate proxy server (access method) for fetching a given URL. In other words, PAC files are primarily used to steer network traffic generated by a user/application.

In accordance to some embodiments, the SaaS proxy agent is modified to serve as a primary proxy control for all Internet traffic initiated on or off network in a way that contrasts with its conventional usage which is strictly directed to management of off-network internet traffic (i.e., traffic that is generally initiated through third-party ISP network). The proposed solution amounts to a granular architecture for forwarding and transport of user/application generated internet traffic using SaaS proxy as a primary portal. The implementation involves specific modification to the SaaS proxy agent/server and the Proxy Auto-Configuration (PAC) files in conjunction with other network modifications, to thereby enable surgical traffic control, uniformly applied to on and off network traffic with built in redundancy.

Figure 1:
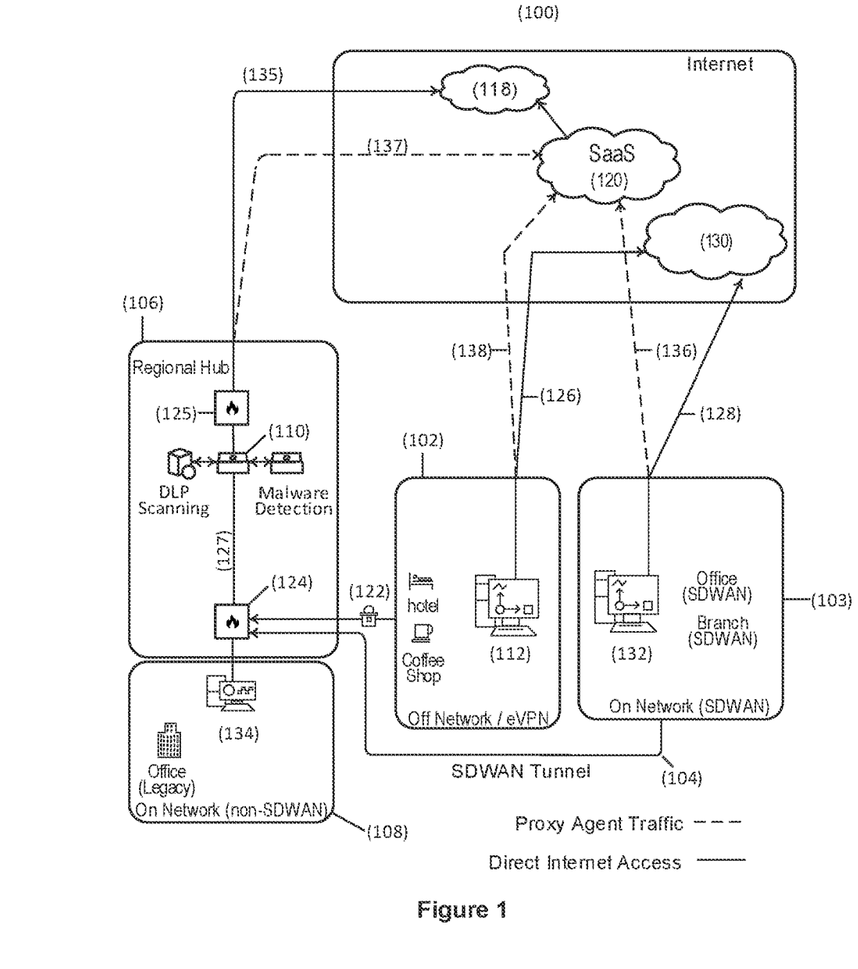
FIG. 1 is an exemplary schematic diagram of SaaS Proxy traffic flow in an exemplary hybrid SaaS proxy-based internet access architecture, according to an exemplary embodiment of the present disclosure.

FIG. 1 illustrate hybrid network 100 with an off-network portion (102) and an on-network infrastructure comprising a Campus site (103) with a Software-Defined Wide Area Network (SDWAN) based connection/tunnel (104) to a regional hub (106), and a main legacy office (108) with a direct connection to the regional hub (106). The regional hub hosts an on-premise proxy (110) for providing secure web/Internet access. For the purpose of the present disclosure, regional hub is interchangeably referred to as a "hub."

Referring back to FIG. 1, endpoint devices (112) on the off-network portion (102) running a SaaS proxy agent (e.g., WSS agent) can securely connect to internet destinations (118) via a VPN split tunnel (138) using a SaaS proxy agent running on the endpoint devices (112) and the cloud-located SaaS services/servers (120). Cloud SaaS services (120) will then facilitate secure forwarding of web/Internet traffic to and from remote endpoint devices (112). Endpoint devices (112) on the off-network portion (102) are also connected to the regional hub (106) via a VPN connection (122) (for example to provide remote users with access to enterprise internal destinations). According to some embodiments, the path corresponding to the incoming VPN connection 122 and SDWAN tunnel 104, from the Off-network and Campus sites, respectively, may be extended, at the hub (106) via respective link (123), shown in FIG. 2, and (127), for direct connection to the on-premise proxy (110) located at the regional hub. From there the traffic may be forwarded across either the hub on-premise proxy connection (135) and/or the hub SaaS proxy connection (137) as prescribed by the appropriate PAC file.

Figure 2:
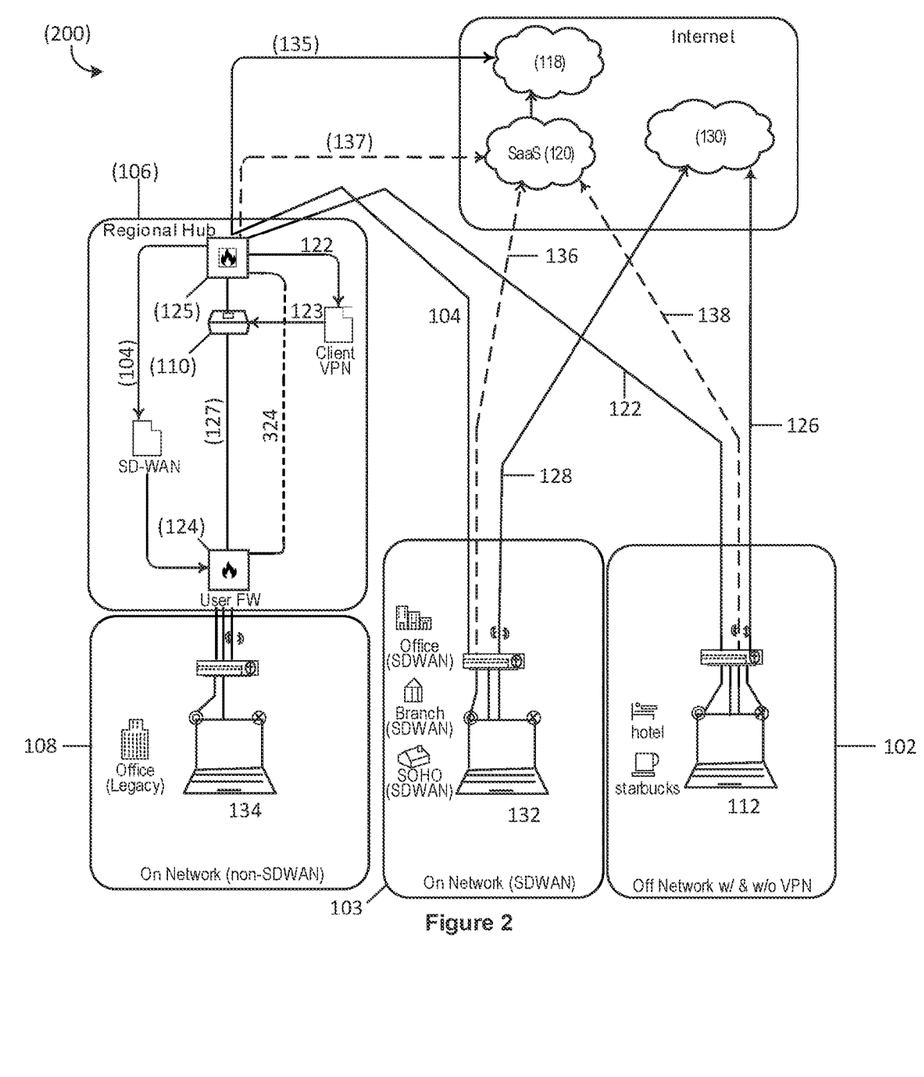
FIG. 2 is an exemplary schematic diagram of a hybrid internet access architecture using cloud and on-premise proxy solutions for redundancy and policy application uniformity.

As illustrated in FIG. 2, outgoing/incoming connections to/from the internet (via on-premise proxy) may go through an application firewall (125) at the hub. According to some embodiments, endpoint devices (112) and (132) may also have dedicated direct internet connections (126) and (128) to one or more cloud-based services (130).

Referring back to FIG. 1, on-network Endpoint devices (132) and (134) located at the Campus site (103) and the main legacy office (108), respectively, can utilize a direct connection (135) to Internet destinations (118) which is established through the on-premise proxy (110) located at the regional hub. With the Campus site being connected to the regional hub via the SDWAN connection (104) as shown in FIG. 1. However, in accordance to some embodiments, which utilize a (modified) SaaS proxy agent, such as a WSS agent, as a primary mechanism for proxy control and web-access security enforcement in an enterprise network, the primary Internet access point, for the on-network Campus and Legacy endpoint devices (132, 134) will correspond to the SaaS proxy connections (136) and (137), respectively. This enables the on-network endpoint devices to connect with Internet destination (118), via SaaS proxy services (120), in the same way as the off-network endpoint device. The cloud-located SaaS services/servers (120) will then facilitate secure forwarding of web/Internet traffic to and from the on-network endpoint devices in the same way as the off-network endpoint devices (112).

In accordance to some embodiments, the on-premise proxy will serve as a failback/redundant portal for steering user web traffic, which improves the resiliency of the arrangement 100. For example, primary path for steering web traffic generated by endpoint devices (132) on the Campus network would be the SaaS proxy connection 136, based on customized settings created within the relevant PAC file and the always-active status of the SaaS proxy agent as implemented in accordance to some embodiment of the present disclosure. The on-premise proxy connection (135) at the Hub, accessible directly from the legacy office and via the SDWAN connection (104) from the Campus site (103), would then serve as a failover proxy-facilitated web traffic path for the on-network endpoint devices (132) and (134) located on the Campus site and the legacy office respectively.

Although the SaaS proxy connection 138 serves as primary path for steering web/internet traffic from off-network endpoint devices (112), the on-premise proxy connection 135 at the Hub (106) still remains accessible by these Off-network endpoint devices via the VPN tunnel connection (122). According to some embodiments of the present disclosure, appropriate PAC files may be configured to steer a portion of the off-network generated user traffic, that is required to remain on the enterprise network, directly to an internal destination or to the on-premise proxy connection (135) via the on-premise proxy device (110) located at the Hub (106). This may be achieved through VPN split tunneling to split the traffic between the VPN tunnel (122), for strictly on-network traffic types (i.e., enterprise internal resources/locations), and SaaS proxy connection (138) for other Internet/web traffic (i.e., corresponding to one or more Internet destinations). This is further facilitated by, for example, modifying the relevant PAC files to steer targeted portions of the off-network generated traffic away from the SaaS proxy connection (138) and towards the hub on-premise proxy connection (135), via tunnel (122).

The on-premise proxy connection 135 at the Hub, accessible by the off-network endpoint devices (112) via the VPN tunnel (122) and the remote on-network endpoints (i.e., endpoints connecting from the Campus site) via the SDWAN connection (104), would also serve as a failover proxy-facilitated traffic steering path for the off-network, remote on-network, as well as the local/Legacy endpoint devices (112, 132, 134). This redundancy in the available proxy-facilitated paths for the steering of user/application generated internet traffic is more clearly depicted in FIG. 2 which illustrates a hybrid proxy-based internet access arrangement (200) using cloud and on-premise proxy solutions, in accordance to some embodiments of the present disclosure.

As shown in FIG. 2, VPN tunnel (122) provides a path for forwarding a portion of the off-network generated traffic away from the default SaaS proxy connection (138) and towards the on-premise proxy (110) to be steered across the on-premise proxy connection (135) at the Hub (106). However, in accordance to some embodiments, off-network endpoint devices may also be provided with a redundant, SaaS proxy-facilitated path at the Hub (i.e., Hub SaaS proxy connection 137) for getting out to Internet destinations (118). This path would then be accessible via the VPN tunnel (122) in case the SaaS proxy connection (138) becomes unavailable.

Referring back to FIG. 2, the Hub SaaS proxy connection (137) may be accessed by the off-network endpoint devices (112), via a path through the VPN tunnel (122) terminating at Client VPN at the Hub, and extending out to the on-premise proxy (110) via a direct connection (123) between the Client VPN and the on-premise proxy (110). The traffic originating from off-network endpoint devices (112) may then be steered onto the Hub SaaS proxy connection (137) for getting out to Internet destinations (118) as facilitated by the cloud-based SaaS service/server (120).

Alternatively, in case the on-premise proxy (110) in not operational, the Hub SaaS proxy connection (137) may be accessed via a proxy bypass link (324) at the Hub which bypasses the on-premises proxy (110) and directly connects to the Hub SaaS proxy connection (137) for secure access to Internet destinations (118) as facilitated by the cloud SaaS service (120). If SaaS proxy service (120) becomes unavailable, the off-network traffic, originating, for example, from endpoint devices (112) and arriving at the Regional Hub via VPN tunnel 122, may be steered to the on-premises proxy (110) in order to use the on-premise proxy connection (135) directly to Internet destinations (118). Traffic steering for this fail over mechanism is achieved through modifications to relevant PAC file(s). According to some embodiments, the off-network SaaS proxy connection (138) and the direct connection (126) to select cloud-based services may be implemented by VPN split tunneling and PAC file(s) modifications for appropriate traffic steering.

As described above with reference to FIG. 1, the on-network traffic originating from the legacy office (108) and the SDWAN-connected Campus site (103) may be configured to utilize the SaaS proxy connections (137) and (136) respectively, as their primary path for Internet traffic, in accordance to some embodiments of the present disclosure. This is accomplished, in accordance to some embodiments, through modifications to the SaaS proxy agents installed on the endpoint devices 134 and 132 in order to maintain them in an active state regardless of the network origination point of the incoming traffic. In case the SaaS proxy connection 136 fails or becomes unresponsive, the endpoint devices (132) at the SDWAN-connected Campus site can still access, through the SDWAN connection (104), the Hub SaaS proxy link (137) for secure Internet access.

Figure 3:
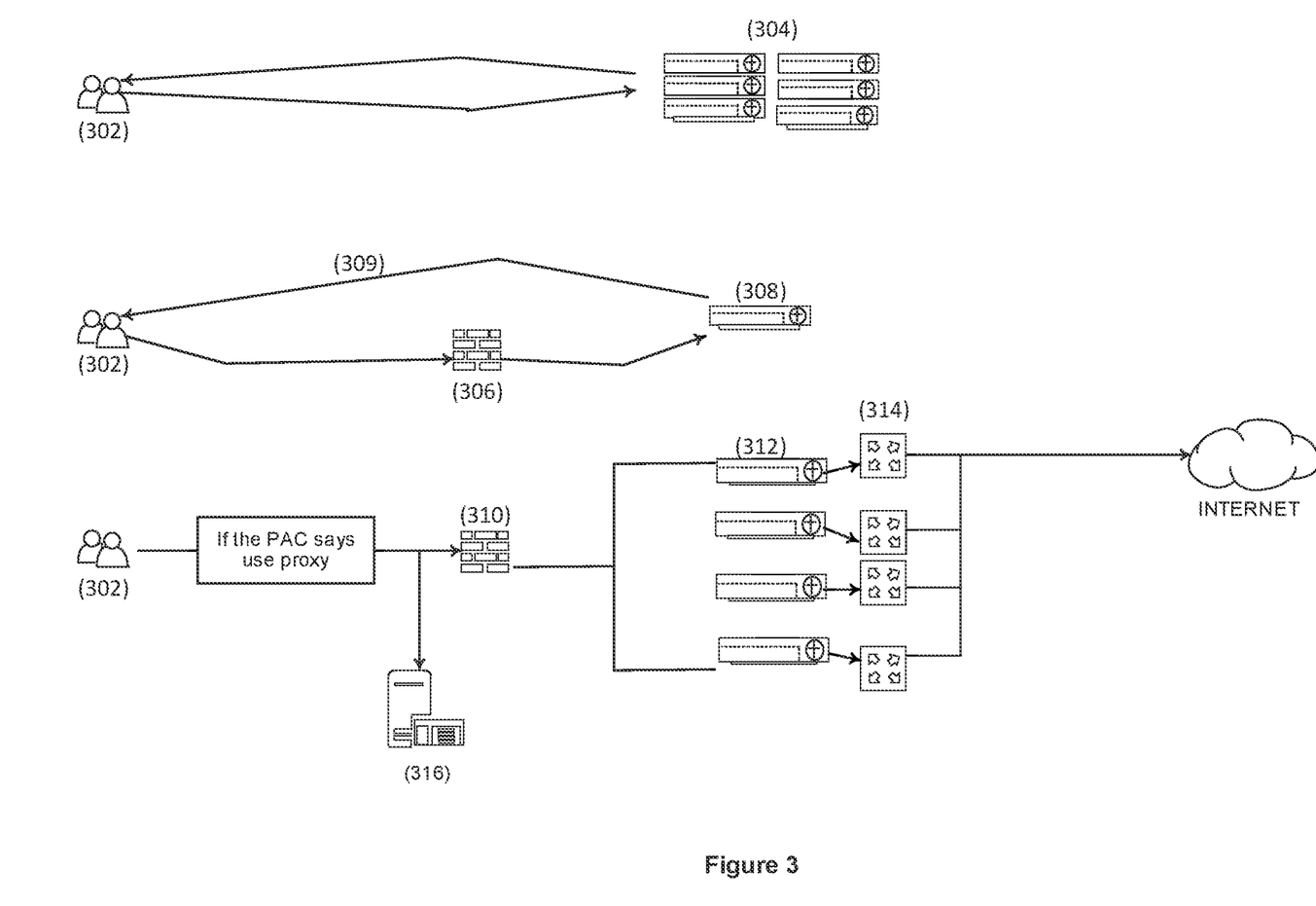
FIG. 3 is a further exemplary schematic diagram illustrating a proxy application/Servers interaction for granular web traffic steering based on PAC file modifications and VPN split tunneling, in accordance to some embodiments of the present disclosure.

Referring back to FIG. 2, the Hub SaaS proxy connection (137) may be accessed by remote endpoint devices (132) connecting, for example, from the Campus site (103), across a path through the SDWAN link (104) terminating at a User firewall (124), and extending therefrom to the on-premise proxy (110) across a direct link (127) between the User FW and the Hub on-premises proxy (110). Alternatively, the Hub SaaS proxy connection (137) may be accessed remotely from the Campus site, through the SDWAN link (104) terminating at a User firewall (124), extending directly to the Hub SaaS proxy connection (137) via a proxy bypass link (324) which bypasses the on-premises proxy (110) and directly connects (through the firewall 125) to the Regional Hub SaaS proxy connection (137) for secure access to Internet destinations (118) as facilitated by the cloud SaaS service (120). If SaaS proxy service (120) becomes unavailable, the traffic, originating from the SDWAN-connected Campus site and arriving at the Regional Hub via SDWAN tunnel 104, may be steered directly to the on-premise proxy (110), through connection (127), in order to use the on-premise proxy connection (135) directly to Internet destinations (118). Traffic steering for this failover mechanism is achieved through modifications to relevant PAC file FIG. 3 provides an exemplary implementation of VPN split tunneling, in accordance to some embodiments of the present disclosure. For example, when user 302 is browsing the internet, user web request is initially directed to one of plurality Global Traffic Manager (GTM), denoted as (304) in FIG. 3. A GTM acts as an intelligent domain name resolver with security-related internal features and logic that can make informed decision on correlating a hostname to an IP address while keeping security in check. Traffic does not route through the GTM. Rather GTM informs the best IP route to use based on one or more metrics for the Internet address (.e., URL) in question. Multiple GTMs as shown in FIG. 3 provide additional redundancy/availability.

Referring back to FIG. 3, once the user (302) gets a reply from a GTM, the traffic is forwarded, via a backend firewall 306, to a Local Traffic Manager (LTM) 308 in order to obtain the associated PAC file. The LTM (308) responds with the appropriate PAC file (309). The PAC file would, for example, determine whether a certain web/internet request (i.e., HTTP/HTTPS or FTP request) would go directly to the specified destination or is to be forwarded to a web proxy server. The PAC file will also specify how web browsers and other user agents can automatically choose the appropriate proxy server (access method) for fetching a given web/Internet address. Once a browser application, utilized by user 302, examines the PAC file, the traffic is forwarded to the Internet in accordance to the settings specified in the PAC file. For example, if the PAC file specifies that a proxy is to be used for steering the traffic, the request is sent, via a backend firewall 310, to a set of LTM 312 which load balance the traffic among a plurality of proxy devices 314. If the web/Internet request is to an internal enterprise destination, the traffic may be sent directly to the appropriate internal application server 316, or forwarded to an on-premise proxy device.

As described, in accordance to some embodiments, the hybrid network with a uniform scheme for Internet traffic control (i.e., on-network and off-network traffic) and security enforcement based on the proposed transparent proxy solution (which utilizes SaaS agent as a primary proxy with changes made to the PAC file to allow for surgical proxy control) also provides for network redundancies in case of cloud-based SaaS proxy connection failure. In such a case, there needs to be a quick rollover to the redundant on-premise proxy connection. In accordance to some embodiments this quick roll-over is enabled by modifying one or more domain name service (DNS) settings for the back end SaaS proxy service. The client side failover modes scenarios for off-network VPN tunnel connections and remote on-network SDWAN based connections are depicted in FIG. 4.

Figure 4:
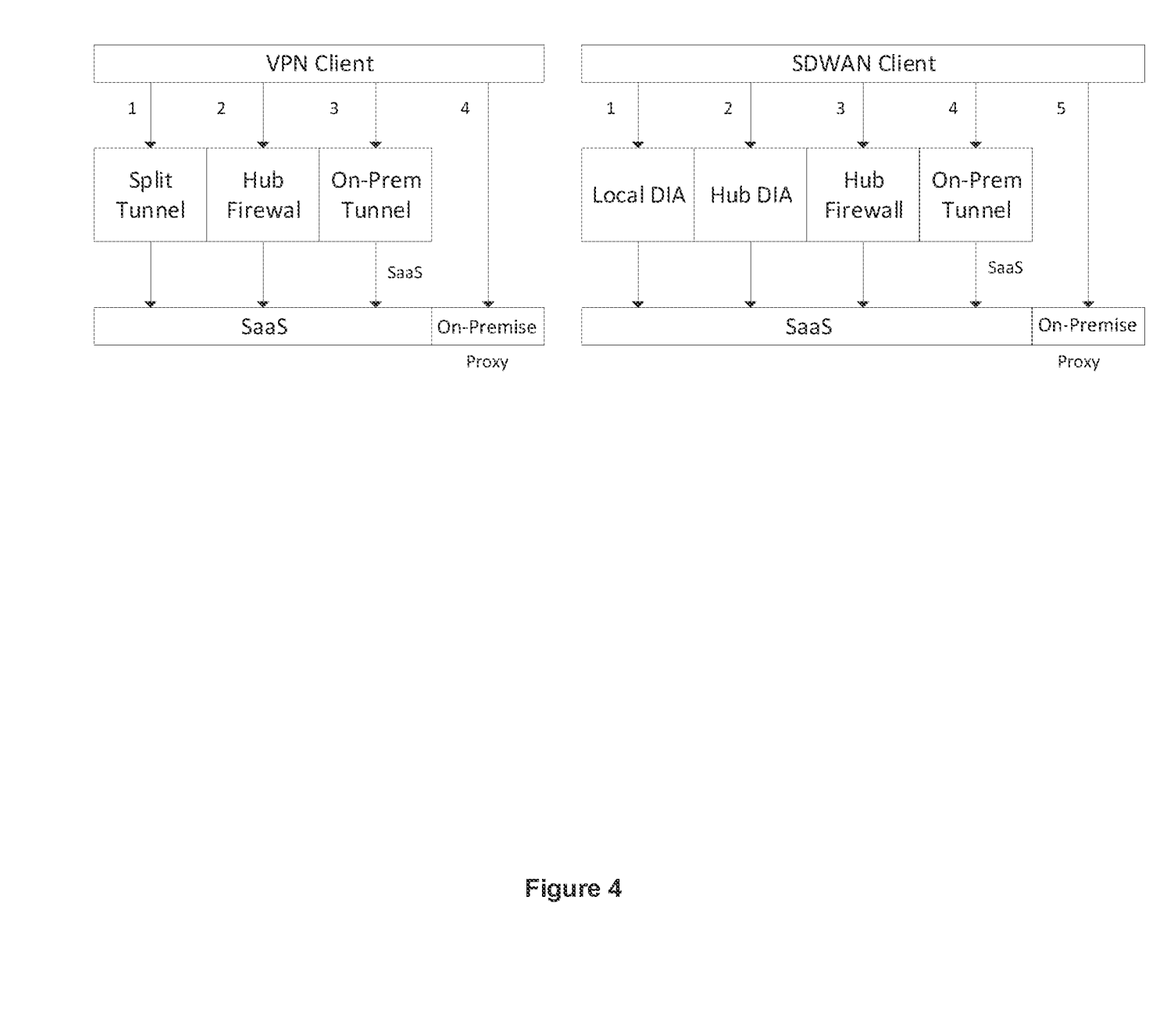
FIG. 4 is a block diagram illustrating failover modes for VPN and SDWAN users in a hybrid network, in accordance to some embodiments of the present disclosure.

FIG. 4 illustrates various secure connectivity options available to a user in accordance to some embodiments of the present disclosure. For example, for a VPN client/user, a first (1) connectivity option involves the split tunnel across the SaaS proxy connection (138) to SaaS cloud service (120) and onto Internet destination (118). If this connection fails, a second (2) connectivity option is provided through the direct connection (123), from the Client VPN, to the on-premise proxy (110) and out to the Internet across the Hub SaaS proxy connection (137) as shown in FIG. 2. This path involves the VPN tunnel connection 122 terminating at Client VPN located at the Hub (106), and further extends across the direct connection (123) from the Client VPN to the on-premise proxy (110) and out to the Internet across the Hub SaaS proxy connection (137).

If the second connectivity pathway fails, for example due to technical difficulties with the on-premise proxy (110), appropriate PAC file may be modified to steer user/application generated Internet traffic to a third (3) connectivity pathway provided through the User Firewall (124) at the Regional Hub (106) and going directly out the firewall (125), bypassing the on-premise proxy (110), and out to the Internet across the Hub SaaS proxy connection (137) towards Internet destinations (118), as facilitated by SaaS cloud service (120). This path involves the VPN tunnel connection 122 and the bypass link (324) and goes out across the Hub SaaS proxy connection (137) to Internet destinations (118). If this connection fails, a fourth (4) connectivity option will involve the fast fail over option to the on-premise proxy connection (135).

Referring back to FIG. 4, with respect to users at a Campus site connected to the Hub (106) via a SDWAN tunnel/connection (104), a first connectivity option (1) involves direct Internet access across the SaaS proxy connection (136) established between a SaaS proxy agent running on endpoint devices (132) and the cloud-based SaaS service/server (120). As described earlier, this is made possible by specific modification to the SaaS proxy agent configuration running on the endpoint devices (132) as well as traffic steering controls implemented via corresponding PAC file modifications. If the first connectivity pathway fails, a second (2) secure connectivity pathway to the Internet is provided through the Regional Hub (106) directly across the Hub SaaS proxy connection (137), towards Internet locations (118), as facilitated by cloud-based SaaS service/server (120). If the second connectivity pathway fails, a third (3) connectivity option is provided from the User firewall (124), across a direct connection (127) to the on-premise proxy (110) and out to the Internet across the Hub SaaS proxy connection (137) as shown in FIG. 2. This path involves the SDWAN connection 104 terminating at the Hub (106), and further extends across the direct connection (127) to the on-premise proxy (110) and out to the Internet across the Hub SaaS proxy connection (137).

If the third secure connectivity pathway fails, for example due to technical difficulties with the on-premise proxy (110), traffic may be steered towards a fourth (4) secure connection path which bypasses the on-premise proxy (110) at the Hub, and goes directly (from the firewall 125) across the Hub SaaS proxy connection (137) out to Internet locations (118), as facilitated by cloud-based SaaS service/server. This path involves the SDWAN connection 104, the bypass link 324 at the Hub, and the Hub SaaS proxy connection (137) as shown in FIG. 2. If the fourth secure connection path fails, a fifth (5) secure connectivity pathway will involve the fast fail over option to the on-premise proxy connection 135.

As described, one aspect of the present disclosure involves application of uniform security policies and protocols for user/application traffic both on and off the enterprise network. In order to achieve this, the on-premise policy, specified in relation to the on-premise proxy, and the security policies associated with the SaaS proxy service are converted to a centralized management platform format such as the Universal Policy Enforcement (UPE) service, in order to unify off network and on network user security implementation and experience to create one expanded enforcement domain.

Another issue that is addressed by the proposed scheme involves applications with hardcoded authentication credentials and/or proxy parameters. This is an important feature as non-proxy aware application-generated traffic may run into authentication problems. Alternatively the required credentials and proxy parameters may need to be provided by the developer during the execution of the application. The issue, therefore, is that the operation of the application may be dependent on manual provision of application credentials and proxy parameters by the developer. This shortcoming is overcome by the proposed solution of implementing a (modified) SaaS proxy agent as the primary steering mechanism for user/application traffic which is implemented, in accordance to some embodiments, by modifying SaaS proxy agent configuration to allow the forwarding of all traffic to the SaaS cloud service, including traffic originating from one or more on-network endpoint device, and further modifying and/or creating one or more PAC file rules to specify the appropriate traffic steering behavior. Transparent authentication of application-generated traffic is then handled by the SaaS proxy agent using, for example, one or more SaaS authentication connectors, thus obviating a need for developers to code credentials and proxy parameters into their application. Additional advantages involve implementing a same level of security uniformly applied to user/application traffic generated on and off the hybrid enterprise network, as well as the ability to surgically control traffic flow in the hybrid network to more optimally manage various client/partner service requirements and internal security concerns.

Figure 5:
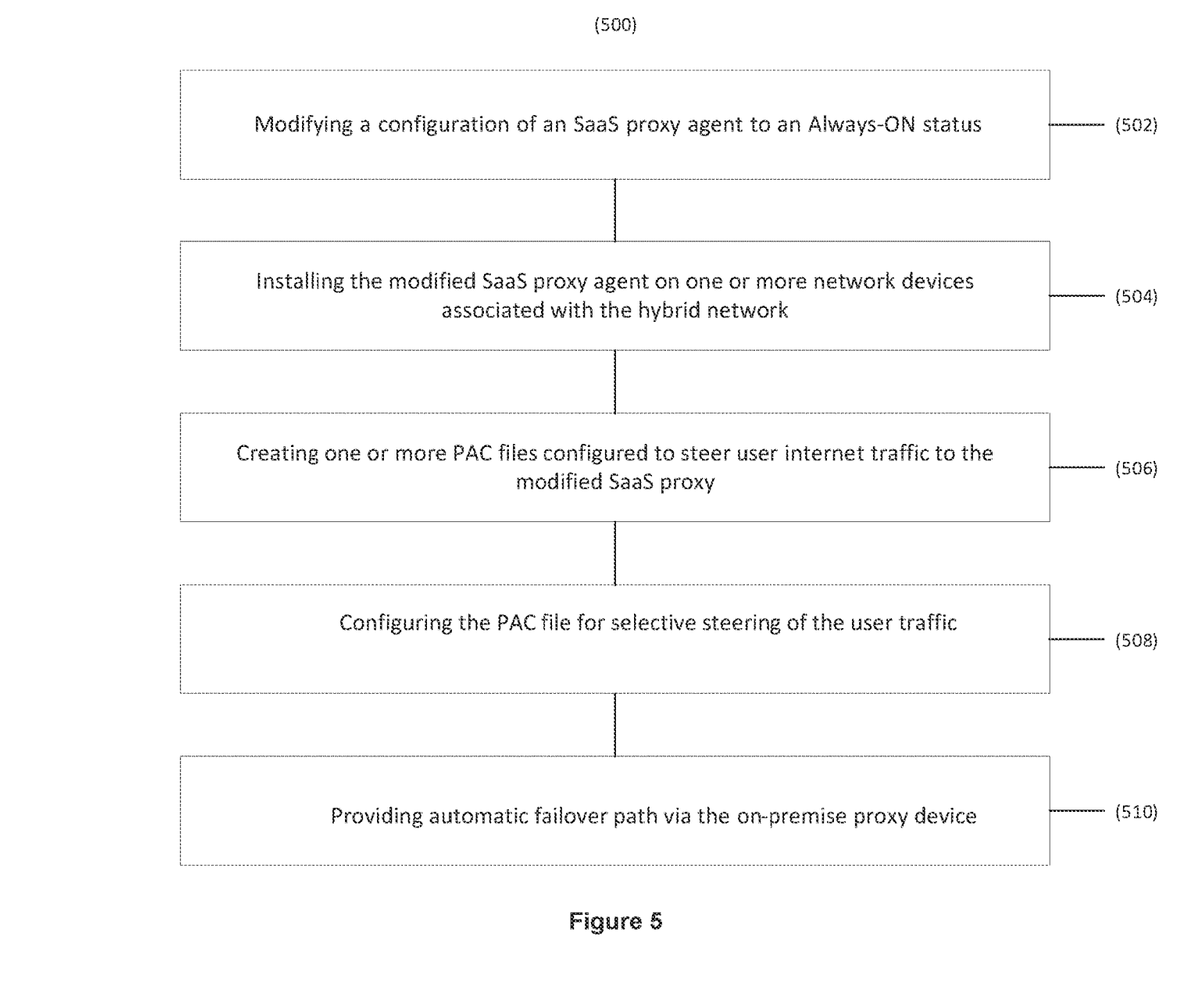
FIG. 5 is a flow diagram illustrating a basic operation for transparent implementation of a primary cloud-based proxy solution for versatile traffic control in a hybrid network, in accordance to some embodiments of the present disclosure.

FIG. 5 illustrates a flow diagram 500 for an exemplary implementation of uniform security enforcement through transparent proxy-based implementation of network traffic control in a hybrid network. With reference to FIG. 5, at step (502) an SaaS proxy agent is modified to remove network location restrictions on the source traffic communicated to the SaaS proxy service. This modification may involve removal of any network location references for incoming traffic from the configuration of the SaaS proxy agent. This will result in a modified SaaS proxy agent having no on-network traffic restriction. At step (504), the modified SaaS proxy agent is installed on one or more network devices associated with the hybrid network, the one or more network device comprising one or more on-network endpoint devices, one or more off-network endpoint devices and one or more gateway device. At step (506), one or more PAC files are created (or alternatively one or more rules are added to an existing PAC file) to facilitate the steering of the hybrid network traffic, including user Internet traffic, towards the modified SaaS proxy agent for Internet access. Accordingly, the PAC file will direct user internet traffic associated with the one or more network devices to the modified SaaS proxy to be forwarded via a SaaS proxy connection to a cloud SaaS proxy service. At step (508), the one or more PAC files being further configured for a more granular and selective steering of the traffic generated by the hybrid network. For Example, PAC file(s) may be configure for steering a portion of the user Internet traffic (i.e., associated with sensitive information or an endpoint device with no SaaS proxy agent installed) towards one or more internal destinations associated with the hybrid network. At step (510), the PAC file is configured to implement a failover mechanism for the Internet traffic associated with the hybrid network according to some embodiments. For example PAC files may be configured for steering the user Internet traffic to a failover on-premise proxy path/connection, when the cloud SaaS proxy service is not available. The failover mechanism may also include the redundant SaaS proxy connections at a hub gateway device (running the modified SaaS agent).

Embodiments of the present disclosure provide a method directed to an inventive use of a software as a service (SaaS) proxy platform, modified so as to transparently facilitate a hybrid network traffic control. The method for implementing the transparent proxy-based hybrid network traffic control comprises modifying a configuration of an SaaS proxy agent by removing one or more network location references for incoming traffic from the configuration, to thereby provide a modified SaaS proxy agent having no on-network traffic restriction. Furthermore, by installing the modified SaaS proxy agent on one or more network devices associated with the hybrid network, the one or more on-network and off-network devices may actively communicates incoming network traffic with a cloud SaaS proxy service without restrictions based on a network source location of the traffic (i.e., whether or not a direct (local/remote) connection to the on-premise proxy device is available).

Once an always-on SaaS proxy connection is set up as described above, the next process may comprise creating one or more proxy auto-configuration PAC files designed/configured for directing user internet traffic associated with or originating from the one or more network devices to the modified SaaS proxy to be forwarded via a SaaS proxy connection to a cloud SaaS proxy service. Therefore, as described, the creation of a primary SaaS proxy mechanism for forwarding of all authorized Internet traffic through a cloud SaaS proxy service may be further facilitated by creating one or more PAC files to direct the relevant network traffic (regardless of the their on/off network origination point) to the modified SaaS proxy agent installed on the network endpoint devices. The PAC file may then be utilized to implement a surgical control of network/Internet traffic generated by users and/or applications associated with the hybrid network. For example, PAC files may be configured for steering a portion of the user Internet traffic towards one or more internal destinations associated with the hybrid network, and/or steering the user Internet traffic to a failover path when the cloud SaaS proxy service is not available, the failover path corresponding to an on-premise proxy device associated with the hybrid network. A PAC file may also be configured to steer Internet traffic from endpoint devices without an installed SaaS proxy agent, directly to the on-premise proxy device to facilitate secure forwarding of such traffic to and from their intended Internet destinations.

In some exemplary embodiments the modified SaaS proxy agent may be installed on a hub gateway, which may be communicatively coupled to an on-premise proxy device. In accordance to some embodiments, the hub gateway device may have a direct connection to some local endpoint devices, a SDWAN based connection to some remotely connected endpoint devices at a Campus site, and a Virtual private Network (VPN) connection to one or more off-network endpoint devices. In this exemplary arrangement a VPN split traffic configuration may be used to implement a direct Internet access via the always-on SaaS proxy connection for secure forwarding of Internet traffic for the one or more off-network endpoint devices.

The hub SaaS proxy connection, based on installation of the modified SaaS proxy agent at a hub gateway device such as a firewall, may be used as a load balancing or a redundant failover SaaS proxy connection for the on-network and off-network devices. In accordance to some embodiments, this my further involve configuring one or more PAC files to steer user Internet traffic, from a campus site and/or an off-network location, towards the hub SaaS proxy connection if the direct Internet access provided by the SaaS proxy connection at the campus site and/or the off-network location devices becomes unavailable. Therefore, the hub SaaS proxy connection may serve as a failover SaaS proxy connection for the one or more remote and off-network endpoint devices. The hub SaaS proxy connection may be accessible to the remote and off-network endpoint device via the SDWAN and the VPN connections respectively.

In some exemplary embodiments of the present disclosure the SaaS proxy platform may further comprise a management application programming interface that is accessible via the SaaS proxy service, and that adds the SaaS proxy service to a primary proxy pool. In some embodiments the one or more security policies associated with the cloud SaaS proxy service and the on-premise proxy device may be combined into a single expanded enforcement domain. This may be accomplished, for example, by converted the security policy format and specifications associated with the cloud SaaS proxy and the on-premise proxy service into a centralized management platform format, by using a universal policy enforcement service.

The modified SaaS proxy platform, as described in accordance to some embodiments of the present disclosure, may also comprise a malware sandboxing server that facilitates malware scanning for web traffic requests based on identified categories of Internet traffic that are associated with known risk levels, and enables web isolation for specific traffic categories. In some embodiments, custom steering for different categories and/or specified destinations of web traffic requests may be carried out in accordance to one or more corresponding Proxy Auto-Configuration (PAC) files. The SaaS proxy platform may further comprise a cloud data loss prevention (DLP) service that is configured via the SaaS proxy agent. In some embodiments the method for transparently facilitating a hybrid network traffic control may utilize one or more authentication connector servers communicatively coupled to the modified SaaS proxy agent to enable transparent authentication of user Internet traffic.

Some aspects of the present disclosure are further directed to a hybrid network with a transparent proxy-based security enforcement mechanism, the hybrid network may consist of on-network endpoint devices connected to the hybrid network via one of a direct connection at a hub (locally connected) and a Software-Defined Wide Area Network (SDWAN) connection at a campus site (remotely connected). The hybrid network may further comprise one or more off-network endpoint devices connected to the hybrid network via a Virtual private Network (VPN) connection (externally connected). The transparent proxy-based security enforcement mechanism associated with the hybrid network, as described in accordance to some embodiments, may then be facilitated through installation of a modified SaaS proxy agents with no traffic restrictions (traffic forwarding being exclusive to off-network traffic in standard SaaS proxy set up) on the one or more on-network and off-network endpoint devices. The modified SaaS proxy agent as configured will forward Internet traffic, associated with the one or more on-network and off-network endpoint devices, to a cloud SaaS proxy service across a SaaS proxy connection.

In accordance to some embodiments, the facilitation of transparent cloud proxy based Internet traffic control as a primary means of managing the user/application generated traffic from the hybrid network may require one or more PAC file rule to be created for the purpose of steering network traffic associated with user Internet traffic to the one or more modified SaaS proxy agents. At this point the traffic with be forwarded towards its intended Internet destination, using the cloud SaaS proxy service. The PAC file(s) may further be configured for granular steering of the traffic that comports to specific requirements of the enterprise associated with the hybrid network or client thereof. For example, PAC file(s) or PAC file rules may be specified to steer network traffic associated with a first restriction to an on premise proxy device to be forwarded to one or more internal and external destinations. The first restrictions may involve traffic associated with sensitive information that is required to be handled on the internal hybrid network, or it may be associated with traffic from endpoint devices that do not have an installed SaaS proxy agent, as well as any other restrictions as it may relate to the operation of the enterprise and services provided to clients.

In some embodiments, a hub location associated with the hybrid network may further comprise an on-premise proxy device communicatively coupled to a hub gateway device, wherein, a modified SaaS proxy agent installed on the hub gateway device provides a backup/redundant hub SaaS proxy connection for forwarding user Internet traffic through the cloud SaaS proxy service. In order to implement the steering of user traffic over to the hub SaaS proxy connection (i.e., for load balancing and/or as a failover option when one or more SaaS proxy connection associated with on-network/ off-network endpoint device fails) one or more PAC may need to be configured to designate the hub SaaS proxy connection as a failover SaaS proxy connection accessible via the VPN and the SDWAN connections.

PAC file(s) may further be created or modified to steer network traffic associated with user/application Internet traffic over to a failover proxy-facilitated path when the cloud SaaS proxy service is not available, the failover path may correspond to the on-premise proxy device at the hub. In some case where the cloud proxy service is operational while SaaS proxy agents installed on the one or more endpoint devices is not, the failover proxy-facilitated path, as identified by one or more PAC file rules, may correspond to a backup SaaS proxy connection established at the hub.

Therefore, one embodiment of the present disclosure, provides for a direct Internet access, securely implemented through the cloud SaaS proxy service, to be made available for on-network as well as off-network connection. According one implementation, the direct Internet access via the modified SaaS proxy agent, may be implemented as a VPN split tunnel on one or more off-network endpoint devices. Therefore, in accordance to embodiments of the present disclosure, the SaaS proxy agent/service may be configured as a primary content filtering and web access security enforcement portal for an enterprise (hybrid) network, while being capable of selectively steering traffic to an on premise proxy when necessary or if a connection to a SaaS proxy service cannot be established.

According to some embodiments, a uniform security enforcement may be achieved for the hybrid network by converting the security enforcement specifications/policies associated with the SaaS proxy service and the on-premise proxy device to a centralized security management format in order to provide the same level of security for both on-premise based and SaaS proxy based network/Internet traffic. One way that this may be achieved is by using a Universal Policy Enforcement (UPE) service.

In accordance to some embodiments of the present disclosure, the hybrid network deployment may comprise: modifying a configuration file associated with a SaaS proxy agent in such a away so as to prevent the SaaS proxy agent from de-activating upon receiving local on-premise, remote on-network, and/or virtual private network (VPN) network traffic, thereby steering both on-network and off-network web traffic, associated with one or more enterprise users, to the SaaS proxy service. The hybrid network may further comprise PAC file created to enable granular re-direction of user/application web/Internet traffic from the SaaS proxy, to the on-premise proxy for one or more designated categories of web traffic. In some embodiments a failover mechanism may be implemented, through modification of the relevant PAC file, to switch traffic steering to the on-premise proxy if a SaaS proxy service becomes inaccessible. In accordance to some embodiments a PAC file may further be configured to steer user Internet traffic associated with endpoint devices without a SaaS proxy agent, towards the on-premise proxy device.

In some embodiments, the hybrid network may further comprise a malware sandboxing server that facilitates malware scanning for user Internet traffic requests based on identified categories of Internet traffic associated with one or more risk levels. The hybrid network may also utilize one or more authentication connector servers, communicatively coupled to the modified SaaS proxy agent, to provide transparent authentication for the user Internet traffic.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method performed by a hybrid network comprising a cloud software as a service (SaaS) proxy server, off network and on network infrastructure including at a campus site which is connected to a hub gateway device and a main office site for transparent cloud based proxy implementation, the method comprising:

receiving and installing an always on or always available modified SaaS proxy agents by a plurality of network devices of the hybrid network, the plurality of network devices comprising one or more on-network endpoint devices at the campus site, one or more off-network endpoint devices at an off network location and one or more gateway devices including the hub gateway device, wherein the modified SaaS proxy agents are generated by modifying a configuration of the SaaS proxy agents by removing one or more network location references for incoming traffic from the configuration such that each of the modified SaaS agents are able to be used for all incoming and outcoming traffic from each of the plurality of network devices of the hybrid network regardless of the source of the traffic;

steering, by the a plurality of network devices based on one or more modified proxy auto-configuration (PAC) files, user internet traffic associated with the plurality of network devices to the cloud SaaS proxy server through the modified SaaS proxy agents, wherein the one or more modified PAC files include a set of exceptions that are scripted to determine whether web browser requests on the plurality of network devices go directly to a destination or are forwarded to the cloud SaaS proxy server of the hybrid network;

establishing a hub SaaS proxy connection at the hub gateway device, based on the modified SaaS proxy agent installed on the hub gateway device, and designating, based on the one or more modified PAC files, the hub SaaS proxy connection as a failover SaaS proxy connection for the one or more off-network endpoint devices and on network endpoint devices, the hub SaaS proxy connection being accessible to the off-network endpoint device via VPN connections;

forwarding, by the modified SaaS proxy agents, the user internet traffic via the SaaS proxy connection to the cloud SaaS proxy server of the hybrid network; and connecting one or more remote endpoint devices of the one or more on-network devices with a Software-Defined Wide Area Network (SDWAN) connection at the campus site to the hub gateway device.

2. The method of claim 1, wherein the one or more modified PAC files are further configured for:

steering a portion of the user Internet traffic towards one or more internal destinations associated with the hybrid network; and steering the user Internet traffic to a failover path when the cloud SaaS proxy server is not available, the failover path corresponding to an on-premise proxy device associated with the hybrid network.

3. The method of claim 1, wherein the one or more off-network endpoint devices are connected to an on-premise proxy device via a Virtual Private Network (VPN) connection, the on-premise proxy device being communicatively coupled to the hub gateway device.

4. The method of claim 1, further comprising:
designating, based on the one or more modified PAC files, the hub SaaS proxy connection as a failover SaaS proxy connection for the one or more remote endpoint devices, the hub SaaS proxy connection being accessible to the remote endpoint devices via the SDWAN.

5. The method of claim 3, further comprising implementing, based on a VPN split traffic configuration, the SaaS proxy connection for secure forwarding of Internet traffic associated with the one or more off-network endpoint devices.

6. The method of claim 2, wherein one or more security policies associated with the cloud SaaS proxy server and the on-premise proxy device are converted to a centralized management platform using a universal policy enforcement service.

7. The method of claim 1, further comprising facilitating, by one or more authentication connector servers communicatively coupled to the modified SaaS proxy agent, transparent authentication of the user Internet traffic.

8. The method of claim 2, wherein the one or more modified PAC files are further configured to steer user Internet traffic associated with endpoint devices without the SaaS proxy agent towards the on-premise proxy device.

* * * * *